(12) United States Patent
Chang

(10) Patent No.: US 10,493,874 B2
(45) Date of Patent: Dec. 3, 2019

(54) SEAT RECLINER FOR VEHICLE

(71) Applicant: HYUNDAI DYMOS INCORPORATED, Seosan-si, Chungcheongnam-do (KR)

(72) Inventor: Seung Hun Chang, Hwaseong-si (KR)

(73) Assignee: Hyundai Dymos Incorporated, Seosan-si, Chungcheongnam-Do (KR)

( * ) Notice: Subject to any disclaimer, the term of this patent is extended or adjusted under 35 U.S.C. 154(b) by 41 days.

(21) Appl. No.: 15/981,453

(22) Filed: May 16, 2018

(65) Prior Publication Data

US 2019/0193603 A1 Jun. 27, 2019

(30) Foreign Application Priority Data

Dec. 26, 2017 (KR) .................. 10-2017-0180240

(51) Int. Cl.
*B60N 2/22* (2006.01)
*B60N 2/20* (2006.01)
(Continued)

(52) U.S. Cl.
CPC ............ *B60N 2/236* (2015.04); *B60N 2/2252* (2013.01)

(58) Field of Classification Search
CPC ..... A47C 1/03255; A47C 1/024; A47C 1/032; A47C 1/03266; A47C 3/20; A47C 7/443; A47C 7/462; A47C 1/03272; A47C 7/441; A47C 7/44; Y10T 29/49826; Y10T 29/49947; B60N 2/2356; B60N 2/236; B60N 2/2252; B60N 2/2358

(Continued)

(56) References Cited

U.S. PATENT DOCUMENTS 5,984,413 A * 11/1999 Baloche ............... B60N 2/2358
297/367 R
6,095,608 A * 8/2000 Ganot .................. B60N 2/2358
297/367 R (Continued)

FOREIGN PATENT DOCUMENTS

KR 10-1690041 B1 12/2016
KR 10-1725412 B1 4/2017

OTHER PUBLICATIONS

Office Action of corresponding Korean Patent Application No. 10-2017-0180240—7 pages (dated Jan. 29, 2019).

*Primary Examiner* — Shin H Kim
(74) *Attorney, Agent, or Firm* — Knobbe Martens Olson & Bear LLP

(57) ABSTRACT

Disclosed is a seat recliner for a vehicle, the seat recliner including: a first flange; a plurality of locking gears seated in the guide spaces of the first flange respectively with lower surfaces thereof facing down, sliding back and forth radially along the guide parts, and provided with external teeth and guide protrusions; a locking cam provided with a locking protrusion on an upper surface thereof; a control member seated on the upper surfaces of the locking cam and the locking gears and provided with a coupling part, a locking hole, and guide slits; a second flange; and an input member inserted into the center of the first flange behind the first flange to be coupled with the control member at an end portion thereof and provided with a locking part at the end portion thereof to be coupled with the coupling part of the control member.

11 Claims, 4 Drawing Sheets

(51) Int. Cl.
  *B60N 2/235* (2006.01)
  *B60N 2/225* (2006.01)
(58) Field of Classification Search
  USPC .......................................................... 297/319
  See application file for complete search history.

(56) References Cited

U.S. PATENT DOCUMENTS

| | | | | |
|---|---|---|---|---|
| 6,112,370 A * | 9/2000 | Blanchard | B60N 2/2358 | 16/325 |
| 7,614,700 B2 * | 11/2009 | Peters | B60N 2/236 | 297/367 P |
| 7,648,205 B2 * | 1/2010 | Zou | B60N 2/20 | 297/367 R |
| 7,703,852 B2 * | 4/2010 | Wahls | B60N 2/236 | 297/367 R |
| 7,878,593 B2 * | 2/2011 | Nae | B60N 2/2254 | 297/362 |
| 8,002,352 B2 * | 8/2011 | Yamada | B60N 2/236 | 297/366 |
| 8,360,525 B2 * | 1/2013 | Cha | B60N 2/0232 | 297/362 |
| 8,459,743 B2 * | 6/2013 | Villarroel | B60N 2/236 | 297/367 P |
| 8,931,843 B2 * | 1/2015 | Schuler | B60N 2/2252 | 297/367 R |
| 8,985,690 B2 * | 3/2015 | Yamada | B60N 2/2358 | 297/341 |
| 9,102,248 B2 * | 8/2015 | Matt | B60N 2/682 | |
| 9,387,781 B2 * | 7/2016 | Matt | B60N 2/2252 | |
| 9,623,774 B2 * | 4/2017 | Yamada | B60N 2/2227 | |
| 9,873,357 B1 * | 1/2018 | McCulloch | B60N 2/2358 | |
| 2006/0279121 A1 * | 12/2006 | Matsumoto | B60N 2/2252 | 297/362 |
| 2008/0001458 A1 * | 1/2008 | Hoshihara | B60N 2/0232 | 297/362 |
| 2008/0175658 A1 * | 7/2008 | Peters | B60N 2/236 | 403/349 |
| 2008/0185892 A1 * | 8/2008 | Peters | B60N 2/236 | 297/362 |
| 2009/0289488 A1 * | 11/2009 | Mitsuhashi | B60N 2/2227 | 297/354.12 |
| 2010/0231022 A1 * | 9/2010 | Kim | B60N 2/2356 | 297/367 R |
| 2012/0223562 A1 * | 9/2012 | Assmann | B60N 2/2252 | 297/362 |
| 2012/0306254 A1 * | 12/2012 | Ishihara | B60N 2/2252 | 297/354.1 |
| 2013/0187426 A1 * | 7/2013 | Nagura | B60N 2/236 | 297/367 P |
| 2014/0225411 A1 * | 8/2014 | Matt | B60N 2/682 | 297/362 |
| 2014/0300158 A1 * | 10/2014 | Jones | A47C 1/03238 | 297/303.1 |
| 2015/0008715 A1 * | 1/2015 | Hur | B60N 2/2356 | 297/367 R |
| 2015/0069809 A1 * | 3/2015 | Matt | B60N 2/2252 | 297/366 |
| 2017/0361736 A1 * | 12/2017 | Chang | B60N 2/2362 | |
| 2018/0103760 A1 * | 4/2018 | Fujita | A47C 1/025 | |
| 2018/0361886 A1 * | 12/2018 | Chang | B60N 2/2356 | |
| 2019/0126789 A1 * | 5/2019 | Lee | B60N 2/236 | |
| 2019/0193602 A1 * | 6/2019 | Chang | B60N 2/236 | |

* cited by examiner

SEAT RECLINER FOR VEHICLE

CROSS REFERENCE TO RELATED APPLICATION

The present application claims priority to Korean Patent Application No. 10-2017-0180240, filed Dec. 26, 2017, the entire contents of which is incorporated herein for all purposes by this reference.

BACKGROUND

Field

The present disclosure relates to a seat recliner for a vehicle.

Description of the Related Art

A vehicle seat includes a seat back for supporting the upper body of the passenger, a seat cushion for supporting the lower body such as the buttocks and thighs, and a headrest for supporting the back of the head. A recliner is provided between a seat cushion and a seat back of a vehicle to release a lock for reclining the seat back if necessary, and to lock the seat back after reclining for maintaining the angle thereof.

The reclining device is divided into a manual-type reclining device, in which the angle of the seat back is adjusted by the passenger manipulating a lever, and a power-type reclining device, which is automatically operated by the power of a motor through manipulating a switch.

The foregoing is intended merely to aid in the understanding of the background of the present invention, and is not intended to mean that the present invention falls within the purview of the related art that is already known to those skilled in the art.

SUMMARY

One aspect of the present invention provides a seat recliner for a vehicle, in which assembly of locking gears and a locking cam is possible with existing control member and input member without requiring an additional component when assembling the control member, the locking gears, and the locking cam together.

Another aspect of the invention provides a seat recliner for a vehicle including: a first flange provided with a plurality of guide parts being spaced apart from each other, with guide spaces defined between the guide parts; a plurality of locking gears seated in the guide spaces of the first flange respectively with lower surfaces thereof facing down, sliding back and forth radially along the guide parts, and provided with external teeth and guide protrusions at an outer circumference and on upper surfaces of the locking gears, respectively; a locking cam seated on a center of the first flange with a lower surface thereof facing down, configured to press the plurality of locking gears while being rotated such that the locking gears are moved forward, and provided with a locking protrusion on an upper surface thereof; a control member seated on the upper surfaces of the locking cam and the locking gears, provided with a coupling part at a center thereof, a locking hole on a lower surface thereof to be locked to the locking cam by the locking protrusion of the locking cam being inserted in the locking hole, and guide slits being configured such that the guide protrusions of the locking gears are inserted into the guide slits to be guided; a second flange coupled with the first flange to be rotatable relative thereto, formed in a shape covering the guide parts, the locking gears, and the control member, and configured to be engaged with the external teeth of the locking gears; and an input member inserted into the center of the first flange behind the first flange to be coupled with the control member at an end portion thereof, and provided with a locking part at the end portion thereof to be coupled with the coupling part of the control member.

The control member and the input member may be molded from a plastic resin material.

The locking cam may be disposed at the center of the first flange, and the plurality of locking gears may be disposed outside the locking cam along an edge of the locking cam to be spaced apart from each other, whereby the guide protrusions of the locking gears are biased outwardly with respect to the locking protrusion of the locking cam.

The control member may be configured such that an insertion hole is formed at the center thereof, the coupling part is provided on an inner circumferential surface of the insertion hole, and the locking hole and the guide slits are provided at locations outside the insertion hole.

The locking hole may be provided at an edge of the insertion hole, and the guide slits may be provided at locations biased outwardly with respect to the locking hole.

The coupling part may protrude along the inner circumferential surface of the insertion hole, and the locking part of the input member may protrude along an outer circumferential surface of the end portion of the input member, whereby the locking part is stopped by the coupling part when inserting the input member.

The coupling part may be formed such that an upper end thereof is inwardly tapered, and a lower end thereof is connected to the inner circumferential surface of the insertion hole.

The locking part of the input member may be formed to have an outer diameter larger than an inner diameter of the coupling part, whereby the locking part is stopped by the coupling part after being forcibly fitted in and passing through the coupling part so as to be prevented from being separated therefrom.

The locking hole may be formed to have an inner diameter equal to an outer diameter of the locking protrusion, and each of the guide slits may be formed in a slit shape extending by a predetermined length with a width equal to a diameter of each of the guide protrusions.

The locking protrusion may be configured such that a pair of locking protrusions is provided at symmetrical positions with respect to a center of the locking cam, the locking hole is configured such that a pair of locking holes is provided at symmetrical positions with respect to a center of the control member, and each of the locking protrusions is vertically inserted into each of the locking holes.

After the input member is inserted into the center of the first flange behind the first flange, the locking part may pass through the locking cam to be coupled with the coupling part of the control member, whereby mounting locations of the locking cam and the locking gears between the control member and the first flange are locked.

According to a seat recliner for a vehicle according to embodiments of the present invention, assembly of locking gears and a locking cam is possible with existing control member and input member without requiring an additional component when assembling the control member, the locking gears, and the locking cam together.

BRIEF DESCRIPTION OF THE DRAWINGS

The above and other aspects, features and other advantages of the present invention will be more clearly understood from the following detailed description when taken in conjunction with the accompanying drawings, in which.

DETAILED DESCRIPTION EMBODIMENTS

Hereinbelow, embodiments of the present invention are discussed in more detail with reference to the accompanying drawings.

Generally, a recliner is configured such that a first flange is fixed, a second flange is relatively rotated, and a locking gear is provided therein, whereby when the locking gear is engaged with the second flange, the locking is performed, and when the locking gear is disengaged therefrom, the second flange is relatively rotated on the first flange, such that the seat back is reclined with respect to the seat cushion.

However, after assembling a locking cam, the locking gears, a control member, and the like to be disposed between the first flange and the second flange, a typical recliner requires an additional retaining ring structure for maintaining the assembly location, the retaining ring fixing an input member, which is inserted from a side of the first flange, at a side of the second flange.

However, the additional retaining ring for such assembly increases the number of components in a product whereby a weight and cost for the product also increase, and tolerance is stacked such that entire tolerance is increased.

Figure 1:
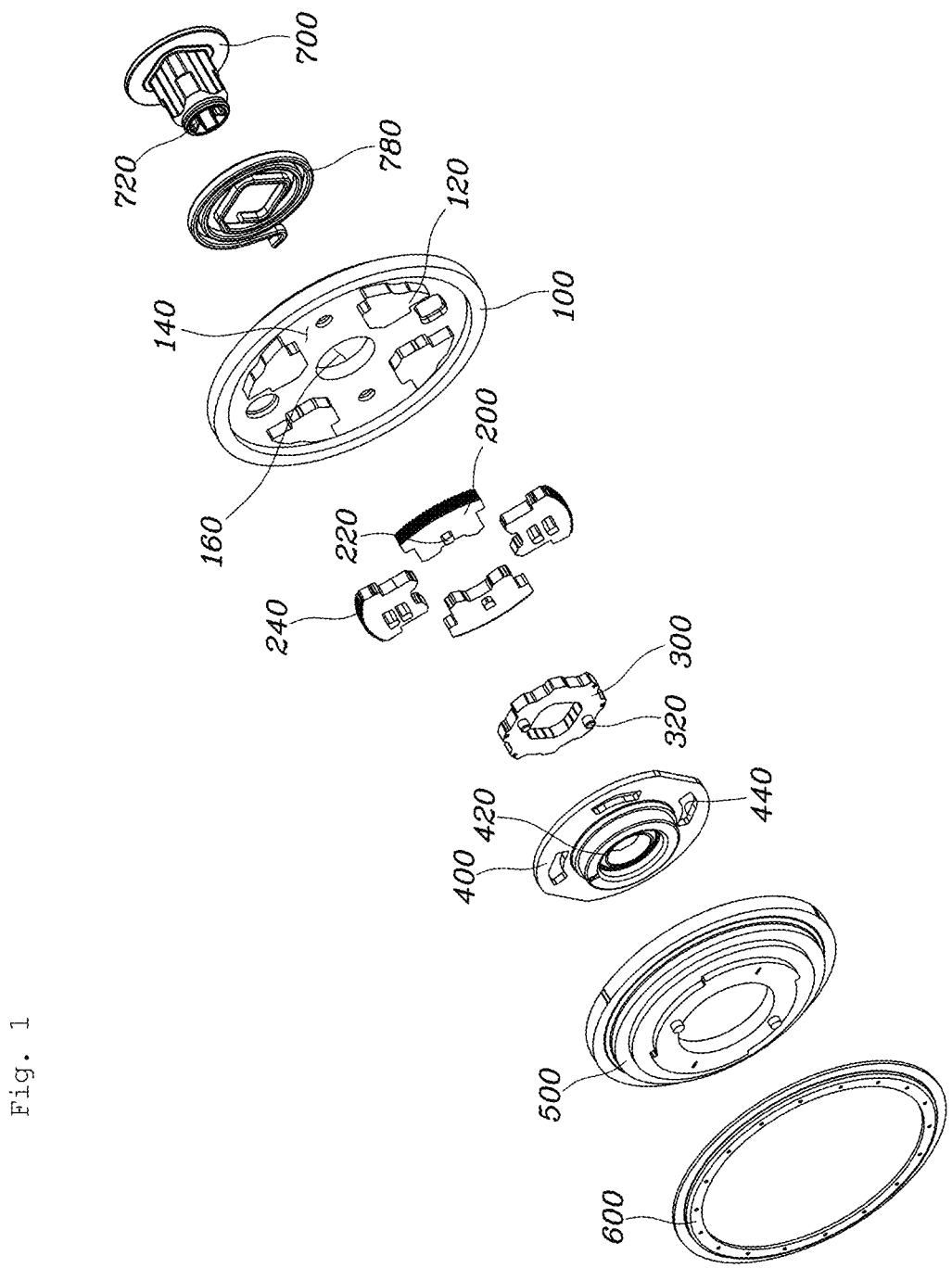
FIG. 1 is an exploded perspective view showing a seat recliner for a vehicle according to an embodiment of the present invention.
Figure 2:
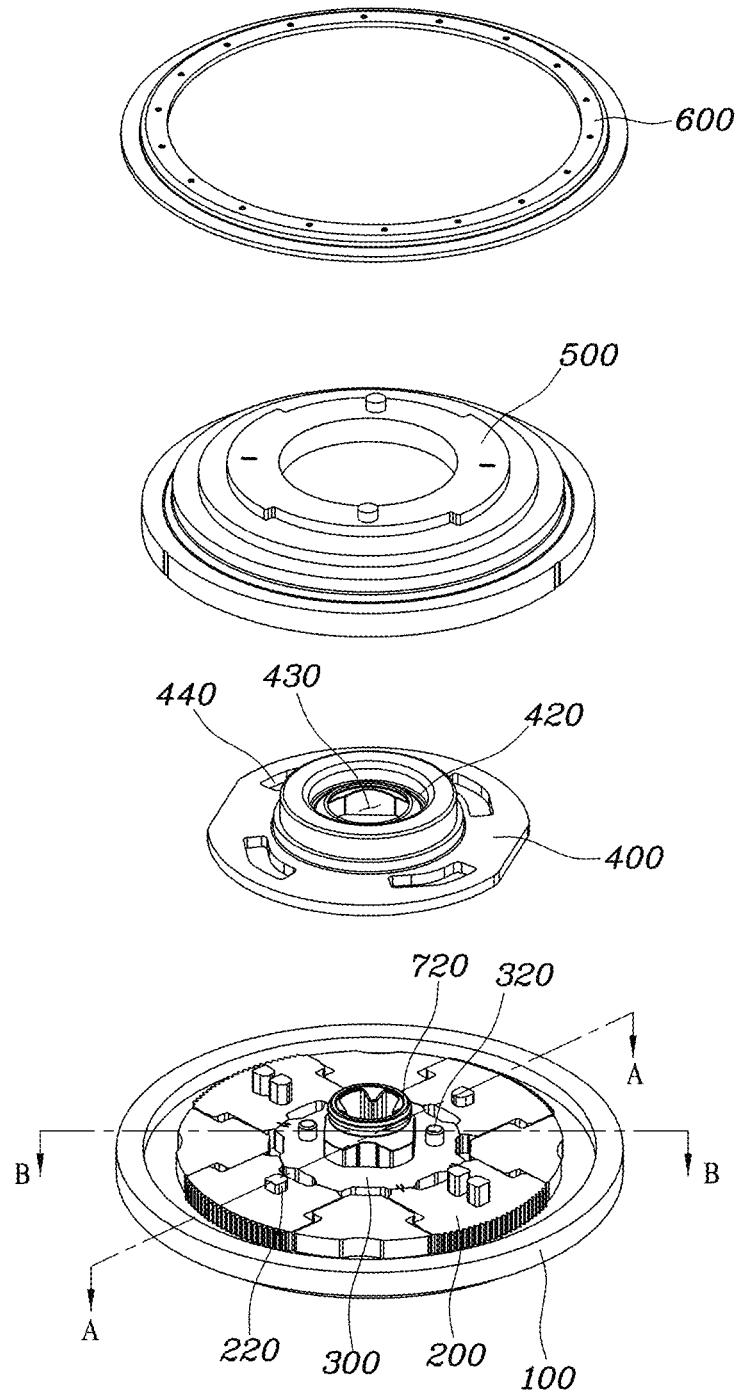
FIGS. 2 to 3 are exploded perspective views showing the seat recliner for a vehicle according to the embodiment of the present invention.
Figure 3:
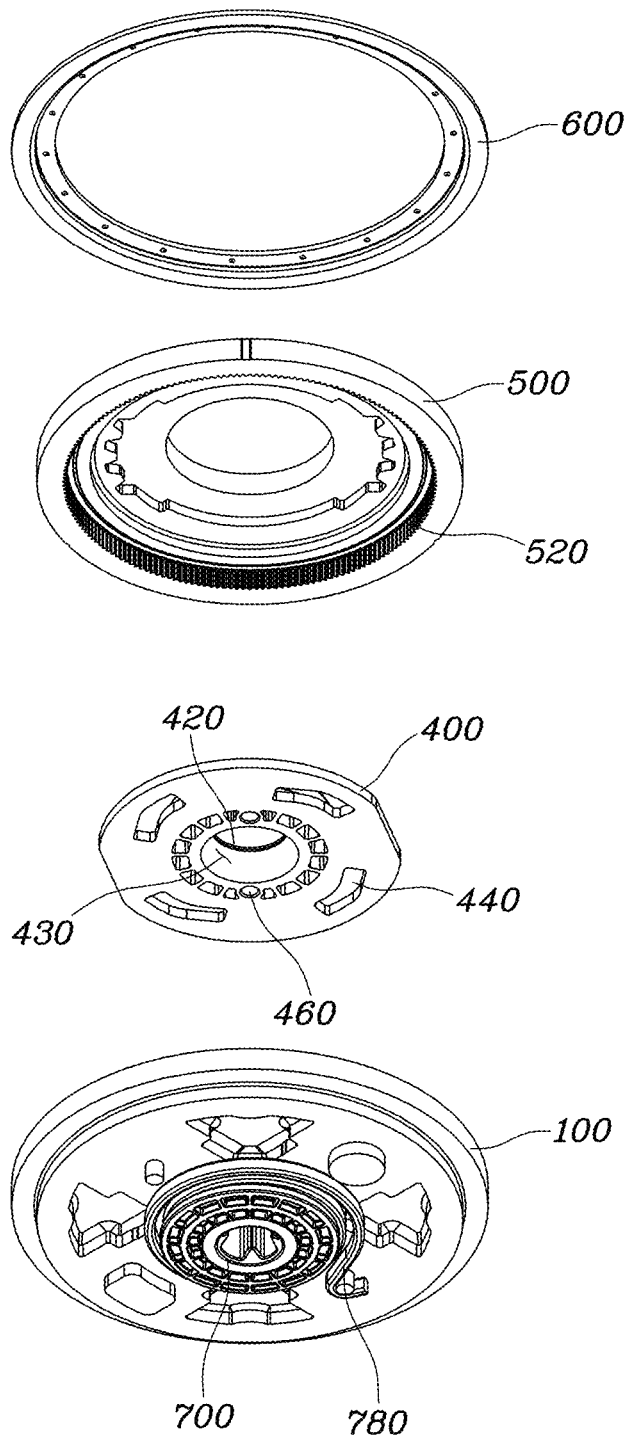
Figure 4:
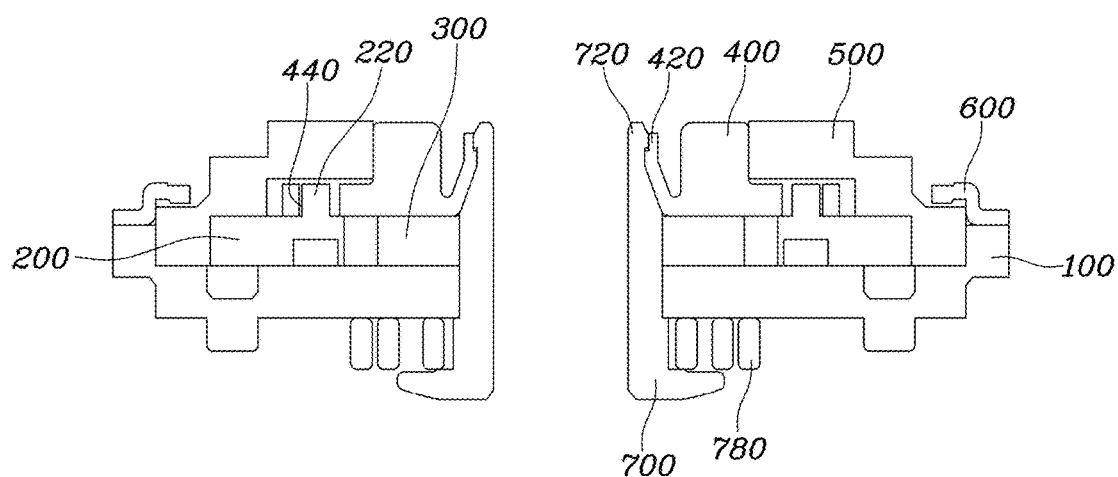
FIGS. 4 to 5 are sectional views each showing the seat recliner for a vehicle shown in FIG. 2.
Figure 5:
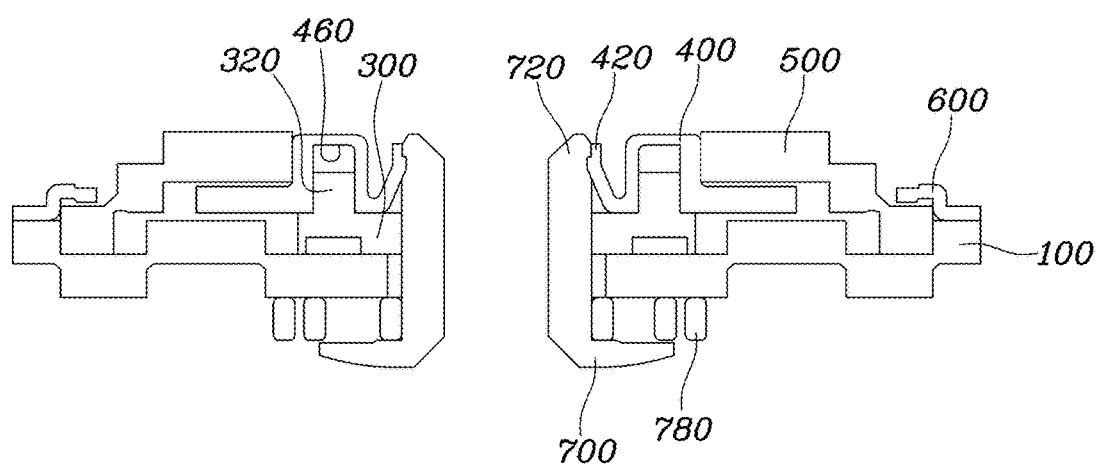

FIG. 1 is an exploded perspective view showing a seat recliner for a vehicle according to an embodiment of the present invention; FIGS. 2 to 3 are exploded perspective views showing the seat recliner for a vehicle according to the embodiment of the present invention; and FIGS. 4 to 5 are sectional views showing the seat recliner for a vehicle shown in FIG. 2.

A seat recliner for a vehicle according to embodiments of the present invention includes: a first flange 100 provided with a plurality of guide parts 120 being spaced apart from each other, with guide spaces 140 defined between the guide parts 120; a plurality of locking gears 200 seated in the guide spaces 140 of the first flange 100 respectively with lower surfaces thereof facing down, sliding back and forth radially along the guide parts 120, and provided with external teeth 240 and guide protrusions 220 at an outer circumference and on upper surfaces of the locking gears, respectively; a locking cam 300 seated on a center of the first flange 100 with a lower surface thereof facing down, configured to press the plurality of locking gears 200 while being rotated such that the locking gears 200 are moved forward, and provided with a locking protrusion 320 on an upper surface thereof; a control member 400 seated on the upper surfaces of the locking cam 300 and the locking gears 200, provided with a coupling part 420 at a center thereof, a locking hole 460 on a lower surface thereof to be locked to the locking cam 300 by the locking protrusion 320 of the locking cam 300 being inserted in the locking hole, and guide slits 440 being configured such that the guide protrusions 220 of the locking gears 200 are inserted into the guide slits 440 to be guided; a second flange 500 coupled with the first flange 100 to be rotatable relative thereto, formed in a shape covering the guide parts 120, the locking gears 200, and the control member 400, and configured to be engaged with the external teeth 240 of the locking gears 200; and an input member 700 inserted into the center of the first flange 100 behind the first flange to be coupled with the control member 400 at an end portion thereof, and provided with a locking part 720 at the end portion thereof to be coupled with the coupling part 420 of the control member 400.

The first flange 100 is provided with the plurality of guide parts 120 being spaced apart from each other as protruding shapes, and the guide spaces 140 are defined between the guide parts 120. The locking gears 200 are disposed at the guide spaces 140. The locking gears 200 are seated in the guide spaces 140 of the first flange 100 respectively with the lower surfaces thereof, and slide back and forth radially along the guide parts 120. In addition, the locking gears 200 are provided with the external teeth 240 at the outer end thereof, and the second flange 500 is provided with internal teeth 520 at an inner circumferential surface thereof as shown in FIG. 3. Accordingly, when the locking gears 200 move by sliding from the guide spaces 140, the external teeth 240 provided at the outer circumference of the locking gears 200 are engaged with the internal teeth 520 of the second flange 500 whereby rotations of each of the first flange 100 and the second flange 500 are locked relatively. Because an externally mounted spring 780 provides a rotation force in a direction in which the locking gears 200 always move forward as described above, a seat back and a seat cushion can maintain respective degrees thereof.

Meanwhile, the locking gears 200 are provided with the guide protrusions 220 on the upper surfaces thereof. The locking gears 200 are engaged with the control member 400 due to the guide protrusions 220, and when the control member 400 rotates, the locking gears 200 slide backward due to the guide protrusions 220 to disengage from the second flange 500. Thus, in such case, the seat back and the seat cushion are in a state in which relative angles can be adjusted.

The locking cam 300 is seated on the center of the first flange 100 with the lower surface thereof. The locking cam 300 is configured to press the plurality of locking gears 200 while being rotated such that the locking gears 200 are moved forward. In addition, the locking cam 300 is provided with the locking protrusion 320 on the upper surface thereof. The locking protrusion 320 of the locking cam 300 is also engaged with the control member 400 such that the guide protrusions 220 of the locking gears 200 guide the control member 400. On the other hand, the locking protrusion 320 of the locking cam 300 is fixed to the control member 400 to engage therewith. Thus, the control member 400 and the locking cam 300 always rotate together.

In detail, the control member 400 is seated as covering the upper surfaces of the locking cam 300 and locking gears 200, and provided with the coupling part 420 at the center thereof. In addition, the control member 400 is provided with the locking hole 460 on the lower surface thereof to be locked to the locking cam 300 by the locking protrusion 320 of the locking cam 300 being inserted in the locking hole 460, and also provided with the guide slits 440 configured such that the guide protrusions 220 of the locking gears 200 are inserted into the guide slits 440 to be guided. The second flange 500 is coupled with the first flange 100 to be rotatable relative thereto, and formed in the shape covering the guide parts 120, the locking gears 200, and the control member 400, and configured to be engaged with the external teeth 240 of the locking gears 200.

The input member 700 is inserted into the center of the first flange 100 behind the first flange 100 to be coupled with the control member 400 at the end portion thereof, and provided with the locking part 720 at the end portion thereof to be coupled with the coupling part 420 of the control member 400. In embodiments of the present invention, the input member 700 is inserted through the first flange 100 lastly behind the first flange 100 such that the penetrating input member 700 is directly coupled with the control member 400 at the end portion thereof. Then, in above state, a retainer 600 is put on the second flange 500 from above and is then fastened together such that an entire assembly is completed. Therefore, elements such as a retaining ring in a typical recliner are unnecessary and the number of parts can be reduced.

In detail, the control member 400 and the input member 700 may be molded from a plastic resin material. That is, other components are formed with a steel material for strength, on the other hand, the input member 700 and the control member 400 are molded from a resin material such that it is easy to mold the locking hole 460 and the guide slits 440 on the control member 400. In addition, the input member 700 and the control member 400 can be coupled with each other using elastic deformation, without a retaining ring.

Meanwhile, the locking cam 300 may be disposed at the center of the first flange 100, and the plurality of locking gears 200 may be disposed outside the locking cam 300 along an edge of the locking cam 300 to be spaced apart from each other, whereby the guide protrusions 220 of the locking gears 200 are biased outwardly with respect to the locking protrusion 320 of the locking cam 300. Accordingly, the locking hole 460 may be provided at an edge of an insertion hole 430, and the guide slits 440 may be provided at locations biased outwardly with respect to the locking hole 460.

FIG. 4 is a sectional view taken along line A-A of FIG. 2, and FIG. 5 is a sectional view taken along line B-B of FIG. 2. In FIG. 4, it is possible to see a state from the outside wherein the guide protrusions 220 of the locking gears 200 are inserted into the guide slits 440 of the control member 400, and in FIG. 5, it is possible to see a an internal state wherein the locking protrusion 320 of the locking cam 300 is inserted into the locking hole 460 of the control member 400.

The locking cam 300 is disposed at an inner side of the locking gears 200 and thus to fix the locking cam 300 and to couple the locking gears 200 on the control member 400, the control member 400 includes the locking hole 460 at far inside thereof, the locking protrusion 320 of the locking cam 300 being inserted into the locking hole 460, as shown in FIG. 3. However, if the control member 400 is made of a steel material as in a typical recliner, the locking hole 460 is needed to be formed by half-piercing, or the like. However, in such case, since grooves always accompany protruding parts, a layout of the control member 400 is limited and the product becomes thick. Therefore, the control member 400 is manufactured by injection molding to ensure the degree of freedom in design, and in particular, a fastening force of the control member 400 with the input member 700 can be easily ensured by using an elastic behavior of an injection material.

The control member 400 may be configured such that the insertion hole 430 is formed at the center thereof, the coupling part 420 is provided on an inner circumferential surface of the insertion hole 430, and the locking hole 460 and the guide slits 440 are provided at locations outside the insertion hole 430. In addition, the coupling part 420 may protrude along the inner circumferential surface of the insertion hole 430, and the locking part 720 of the input member 700 may protrude along an outer circumferential surface of the end portion of the input member 700, whereby the locking part 720 is stopped by the coupling part 420 when inserting the input member 700.

In detail, as shown in FIGS. 4 and 5, the coupling part 420 may be formed such that an upper end thereof is inwardly tapered as a funnel or a conical hat, and a lower end thereof may be connected to the inner circumferential surface of the insertion hole 430. Accordingly, the upper end of the coupling part 420 has appropriate deformation and elasticity as a free end, and when coupling the input member 700, the locking part 720 of the input member 700 may be formed to have an outer diameter larger than an inner diameter of the coupling part 420, whereby the locking part 720 is stopped by the coupling part 420 after being forcibly fitted in and passing through the coupling part 420 so as to be prevented from being separated therefrom.

In addition, the locking hole 460 may be formed to have an inner diameter equal to an outer diameter of the locking protrusion 320 whereby the locking cam 300 and the control member 400 preferably rotate together without clearance, and each of the guide slits 440 is formed in a slit shape extending by a predetermined length with a width equal to a diameter of each of the guide protrusions 220, thereby simply guiding the guide protrusions 220 without fixing.

Furthermore, the locking protrusion 320 may be configured such that a pair of locking protrusions 320 is provided at symmetrical positions with respect to a center of the locking cam 300, the locking hole 460 may also be configured such that a pair of locking holes is provided at symmetrical positions with respect to a center of the control member 400, and each of the locking protrusions 320 may be vertically inserted into each of the locking holes. Accordingly, the locking protrusion 320 and the locking hole 460 are stably coupled with each other, and torque transmitted between the control member 400 and the locking cam 300 can be stably supplied, thereby enhancing durability of the components and operating smoothly.

Finally, after the input member 700 is inserted into the center of the first flange 100 flange behind the first flange 100, the locking part 720 of the input member 700 passes through the locking cam 300 to be coupled with the coupling part 420 of the control member 400, whereby mounting locations of the locking cam 300 and the locking gears 200 between the control member 400 and the first flange 100 are locked. Thus, a construction such as an additional retaining ring is unnecessary for assembly as described above.

According to the seat recliner for a vehicle of embodiments of the present invention, assembly of the locking gears and the locking cam is possible with the existing control member and input member without requiring an additional component for assembling the control member, the locking gears, and the locking cam.

Although embodiments of the present invention have been described for illustrative purposes, those skilled in the art will appreciate that various modifications, additions and substitutions are possible, without departing from the scope and spirit of the invention as disclosed in the accompanying claims.

What is claimed is:
1. A seat recliner for a vehicle, the seat recliner comprising:
    a first flange provided with a plurality of guide parts being spaced apart from each other, with guide spaces defined between the guide parts;

a plurality of locking gears seated in the guide spaces of the first flange respectively with lower surfaces thereof facing down, sliding back and forth radially along the guide parts, and provided with external teeth and guide protrusions at an outer circumference and on upper surfaces of the locking gears, respectively;

a locking cam seated on a center of the first flange with a lower surface thereof facing down, configured to press the plurality of locking gears while being rotated such that the locking gears are moved forward, and provided with a locking protrusion on an upper surface thereof;

a control member seated on the upper surfaces of the locking cam and the locking gears, provided with a coupling part at a center thereof, a locking hole on a lower surface thereof to be locked to the locking cam by the locking protrusion of the locking cam being inserted in the locking hole, and guide slits being configured such that the guide protrusions of the locking gears are inserted into the guide slits to be guided;

a second flange coupled with the first flange to be rotatable relative thereto, formed in a shape covering the guide parts, the locking gears, and the control member, and configured to be engaged with the external teeth of the locking gears; and an input member inserted into the center of the first flange behind the first flange to be coupled with the control member at an end portion thereof, and provided with a locking part at the end portion thereof to be coupled with the coupling part of the control member.

2. The seat recliner of claim 1, wherein the control member and the input member are molded from a plastic resin material.

3. The seat recliner of claim 1, wherein the locking cam is disposed at the center of the first flange, and the plurality of locking gears is disposed outside the locking cam along an edge of the locking cam to be spaced apart from each other, whereby the guide protrusions of the locking gears are biased outwardly with respect to the locking protrusion of the locking cam.

4. The seat recliner of claim 1, wherein the control member is configured such that an insertion hole is formed at the center thereof, the coupling part is provided on an inner circumferential surface of the insertion hole, and the locking hole and the guide slits are provided at locations outside the insertion hole.

5. The seat recliner of claim 4, wherein the locking hole is provided at an edge of the insertion hole, and the guide slits are provided at locations biased outwardly with respect to the locking hole.

6. The seat recliner of claim 4, wherein the coupling part protrudes along the inner circumferential surface of the insertion hole, and the locking part of the input member protrudes along an outer circumferential surface of the end portion of the input member, whereby the locking part is stopped by the coupling part when inserting the input member.

7. The seat recliner of claim 6, wherein the coupling part is formed such that an upper end thereof is inwardly tapered, and a lower end thereof is connected to the inner circumferential surface of the insertion hole.

8. The seat recliner of claim 7, wherein the locking part of the input member is formed to have an outer diameter larger than an inner diameter of the coupling part, whereby the locking part is stopped by the coupling part after being forcibly fitted in and passing through the coupling part so as to be prevented from being separated therefrom.

9. The seat recliner of claim 1, wherein the locking hole is formed to have an inner diameter equal to an outer diameter of the locking protrusion, and
each of the guide slits is formed in a slit shape extending by a predetermined length with a width equal to a diameter of each of the guide protrusions.

10. The seat recliner of claim 1, wherein the locking protrusion is configured such that a pair of locking protrusions is provided at symmetrical positions with respect to a center of the locking cam,
the locking hole is configured such that a pair of locking holes is provided at symmetrical positions with respect to a center of the control member, and
each of the locking protrusions is vertically inserted into each of the locking holes.

11. The seat recliner of claim 1, wherein after the input member is inserted into the center of the first flange behind the first flange, the locking part passes through the locking cam to be coupled with the coupling part of the control member, whereby mounting locations of the locking cam and the locking gears between the control member and the first flange are locked.

* * * * *